United States Patent Office 2,811,459
Patented Oct. 29, 1957

2,811,459

POLYAMIDE SUSPENSOIDS FORMING CONTINUOUS FILMS

Harold Wittcoff and Wesley A. Jordan, Minneapolis, Minn., assignors to General Mills, Inc., a corporation of Delaware No Drawing. Application October 16, 1953, Serial No. 386,674

8 Claims. (Cl. 106—153)

The present invention relates to the compositions of matter comprising polyamide resins dispersed to a very high degree in an aqueous medium. The dispersions are hereinafter referred to as suspensoids and are composed of a solid phase of polyamide resin particles and a liquid aqueous phase. The present invention contemplates the dispersion of resins melting within the approximate range of 25 to 95° C. It will be appreciated therefore, that the resin particles in the suspensoids, especially those prepared from the lower melting resins, will be plastic and generally tacky. Nevertheless they are essentially solid in character and the term suspensoid will be used with reference to the dispersion of these resins. The suspensoids of these resins dry to form continuous tacky films when spread on a surface and dried. As used herein the term "suspensoid" is intended to refer to aqueous dispersions of soild particles having a range of particle size varying from 0.1 to 10 microns. The suspensoids are opaque to the naked eye but the bulk of particles are visible under a light microscope. In the present invention the bulk of the particles fall within the above range of particle sizes with the average particle size being about one micron. The solids in these suspensoids cannot be filtered out by ordinary means.

The present application is a continuation-in-part of our copending application 227,535, filed May 21, 1951, now abandoned, which in turn is a continuation-in-part of our copending application Serial No. 141,262, filed January 30, 1950, now abandoned.

The present invention is directed to polyamide suspensoids derived from polymeric fat acids and polyamines having at least three atoms intervening between the amino groups principally involved in the amidification reaction, which suspensoids are capable of forming continuous tacky films at temperatures as low as room temperature and even somewhat below room temperature.

The suspensoids of the present invention possess a variety of properties which make them useful for numerous purposes. An important use for such suspensoids is as wet-stick adhesives. They may be substituted for other wet-stick adhesives in conventional gluing and sealing equipment. They are superior to water-soluble adhesives or water-based polymer dispersions such as polyvinyl acetate emulsions, in that they become entirely water-proof upon drying, and are resistant to alkali, solvents, and grease. Other wet-stick adhesives, such as latices, also become waterproof upon drying. However, such latices coat the glue pots and glue application equipment and can be removed therefrom after solidification only with great difficulty. In contrast thereto the present suspensoids can be readily dissolved by means of mildly acidic solutions such as 2% acetic acid.

The present suspensoids adhere to a wide variety of materials and may be used as wet-stick adhesives therefor. Such materials include cloth, glass, wood, paper, glassine, fiber board, and other cellulosic material, metal foils, polyvinylidene chloride films (and copolymers thereof), vinyl films, Pliofilm, polyethylene, and the like. Moreover, these suspensoids have good tolerance for solvents commonly used in wet-stick adhesives, such as esters, hydrocarbons, ketones and tetrahydrofuran.

The present suspensoids may also be employed as plasticizers and tackifiers for dispersions of hard resins. They may also be added to other wet-stick adhesives to extend them and to improve their properties. Thus polyvinyl acetate dispersions are wet-stick adhesives but produce a bond which is not water resistant. The addition of suspensoids of the present type to polyvinyl acetate dispersions plasticizes and tackifies the latter, and what is most important, imparts water resistance to the bonds produced therefrom.

It is therefore an object of the present invention to provide novel polyamide suspensoids derived from polymeric fat acids and polyamines having at least three atoms intervening between the amine groups principally involved in the amidification reaction, which suspensoids are capable of forming continuous tacky films.

It is another object of the invention to provide a novel process of producing such suspensoids.

The polyamides to which the present invention relates are those derived from polymeric higher fatty acids and polyamines having at least three atoms intervening between the amine groups principally involved in the amidification reaction. The polymeric fat acids employed may be those resulting from the polymerization of drying or semi-drying oils, or the free acids or simple aliphatic alcohol esters thereof. Suitable drying or semi-drying oils include soybean, linseed, tung, perilla, oiticica, cottonseed, corn, tall, sunflower, safflower, dehydrated castor oil, and the like. In the polymerization process for the preparation of the polymeric fat acids, the fatty acids with sufficient double bond functionality combine, for the most part, probably by a Diels-Alder mechanism to provide a mixture of diabasic and higher polymeric acids. The acids with insufficient functionality to react remain as monomers and may be removed by distillation. The residue after distillation consists of the desired polymeric acids, and this mixture is used for the preparation of the polyamide resin. In place of this method of polymerization, any other method of polymerization may be employed, whether the resultant polymer possesses residual unsaturation or not. The term "polymeric fat acid" as used herein is intended to include the polymerized mixture of acids obtained, which mixture usually contains a predominant proportion of dimeric acids, a smaller quantity of trimeric and higher polymeric acids, and some residual monomer.

The polyamines which may be employed for the preparation of the polyamides are those in which the amine groups which are principally involved in the amidification reaction are separated by at least three atoms. These three atoms may be carbon atoms or hetero atoms. Typical of the polyamines which may be used are diethylene triamine, triethylene tetramine, tetraethylene pentamine, 1,4-diamine butane, 1,3-diamino butane, hexamethylene diamine, diacetone diamine, 3-(N-isopropylamino) propylamine, 3,3'-iminobispropylamine, and the like. It will be observed that in the case of the first three named polyamines there are amine groups which are separated by only two carbon atoms. However, the amidification reaction involves the primary amine groups principally, and accordingly the product obtained is suitable for the purposes of the present invention. It is also apparent that some of the polyamines contain only a single primary amine group and in addition a secondary amine group. Under these circumstances the secondary amine group also becomes involved in the amidification reaction to a large extent whereas in the case of diethylene triamine, for example, the two primary amine groups are primarily involved. From the above discussion it is apparent that a wide variety of polyamines may be employed as long as the amine groups primarily involved in the amidification reaction are separated by at least 3 atoms.

In the preparation of the polyamide the polymeric fat acids are reacted with any of the polyamines referred to above either singly or in admixture. The final polyamide obtained must have some free amine groups, the relative number of which is referred to as the amine number. As used herein "amine number" means the milligrams of KOH equivalent to the free amine groups in one gram of the resin. This amine number should be at least 5, and preferably is at least 10. Amine number may be as high as 200 or more. This amine number may be the result of the employment of the polyamine in excess or as a result of only partial reaction of the polyamine which is employed. Thus in the case of diethylene triamine, triethylene tetramine and tetraethylene pentamine, it is usually preferred to employ the polyamine in a quantity such that the primary amine groups are approximately equivalent to the carboxyl groups in the polymeric fat acids including the carboxyls in the polybasic acids as well as the carboxyl groups in any monomer which may be present. When these proportions are employed, the reaction between the carboxyl groups and the polyamines involves almost entirely the primary amine groups, and the secondary amine groups remain as free amine groups in the polymer. Where less polyamine is employed than that which is equivalent in primary amine groups to the carboxyl groups, some of the secondary amine groups may react with the carboxyl groups and there is the possibility of obtaining cross-linked polymers which would have a tendency to gel. Accordingly it is preferred not to involve the secondary amine groups in the amide-forming reaction where such polyamines as diethylene triamine, triethylene tetramine, and tetraethylene pentamine are employed. Too large an excess of amine groups should be avoided inasmuch as this tends to reduce the size of the polymer to the point where the product might not possess the desired physical characteristics. In general, amine numbers between 5 and 200 are satisfactory, and those skilled in the art can readily determine the particular proportions of amine and polymeric fat acids to be employed for the production of a polymer having the desired characteristics.

Polyamides of this type generally have molecular weights varying from 1,000 to 10,000 and are resistant to the corrosive action of water, alkali, oils, greases, and organic solvents. The melting points vary depending upon the reactants and the reaction conditions. These melting points may vary from about 25° C. to 95° C. They vary in degrees of hardness, depending upon the melting point, but in general, all are tacky resins.

The present invention depends upon the wholly unexpected observation that acids combine with amine groups in the polyamide resins to form amine salt groups and that the polyamide compositions containing these amine salt groups disperse readily without the aid of an added dispersing or emulsifying agent by simply heating and stirring them with water. The amine salt groups are highly efficacious intrinsic emulsifying agents which effect dispersion of the polyamide.

The preparation of a suspensoid from these polyamides involves simply the melting of the polyamide and then the mixture of the melted polyamide with agitation in water containing a small amount of acid. The mixture is heated and stirred and as a result dispersion of the polyamide readily occurs. A wide variety of acids may be employed in the aqueous phase. Suitable acids include formic, acetic, propionic, butyric, monochloracetic, hydrochloric, phosphoric, boric, fumaric, lactic, maleic, oxalic, tartaric, glycollic, benzoic, succinic, terephthalic, furoic, and gallic acids. The temperature employed in dispersing the polyamide in the aqueous acid is preferably above the melting point of the polyamide resin. Since all these resins melt below the atmospheric pressure of the boiling point of water it is preferred to effect the dispersion of all these resins near 100° C. although it is possible to disperse the lower melting resins at lower temperatures.

In general, the higher the temperatures that can be used during dispersion the more easily the resins seem to disperse. Accordingly, it is preferred to heat the resin to approximately 130° to 170° C. and then add the hot water containing the acid to the heated resin with stirring to produce an extremely smooth dispersion.

The content of acid employed is usually that equivalent to an amine number of from 5 to 40. Thus with polyamides having a low amine number it may be necessary to add enough acid to completely neutralize the amine number. With polyamides of higher amine number the quantity of acid employed is usually less than that required for reaction with all the amine groups and accordingly, the polyamide in the suspensoid will contain free amine groups. With diethylene triamine resins usually sufficient acid is employed to neutralize amine groups equivalent to an amine number of about 7 to 15. By employing larger quantities of acid, gels may be formed, especially where the amine number is above 20. These are useful in some applications but in general are less desirable. This phenomena, however, may be used to control the viscosity of the suspensoid, particularly in the case of polyamides of high amine number.

The concentration of the acid in the aqueous phase is usually below 10% and frequently of the order of 1%. It is apparent therefore, that the acid does not act as a solvent. The dispersion of the resin results from the formation of the amine salt groups in the polyamide which groups act as an intrinsic emulsifying agent.

The solids concentrations in these suspensoids can be varied widely. Preferred compositions frequently have solids concentrations in the range of 35% to 60%. Higher and lower concentrations are, of course, possible, and extreme dilutions are feasible.

The present polyamide suspensoids are compatible with a wide variety of cationic or non-ionic dispersions and may be used to modify the properties of such dispersions. Typical of these dispersions are natural rubber latex, polyisobutylene latex, butadiene latex, butadiene-styrene copolymer latex, isoprene latex, chloroisoprene latex, acrylonitrile-butadiene copolymer latex; resin emulsions or dispersions such as those derived from polyvinyl acetate, polyvinyl butyral, polyethylene, polyfluoroethylenes; terpene resins; acrylic resins such as polyacrylonitrile, polymethyl methacrylate, and the like; halogen-containing resins such as polyvinyl chloride; phenolic resins such as phenol-formaldehyde resins, fatty and mineral oils; asphalt, and the like.

The present polyamide suspensoids may also be used as a means of dispersing other materials which may be non-dispersible by themselves. These include plasticizers such as a great variety of sulfonamides, such as N-ethyl toluene sulfonamides, tributyl phosphate, tricresyl phosphate, triethyl phosphate, dibutyl phthalate, dioctyl phthalate, dicapryl phthalate, dibenzyl sebacate, 2-ethylhexanediol-1,3, a great variety of rosin derivatives which may also act as tackifiers and which are listed below under tackifiers, a great variety of alkyd type resins such as glycerol castor oil acids-sebacic acid alkyd, dioctyl sebacate, tall oil, chlorinated hydrocarbons, phenolic-type resins, coumarone-indene resins, and in general a great variety of commercial plasticizers of which the hydrocarbon and terpene types are important. Likewise a wide variety of tackifiers may be dispersed with the polyamides. These include many of the above plasticizers and in addition include rosin, disproportionated rosin, hydrogenated rosin, polymerized rosin, rosin from tall oil; the glycol, glycerol, pentaerythritol, 2,2,6,6-tetramethylolcyclohexanol, and other polyhydric alcohol esters of these rosins; maleic-modified rosins, and rosin esters, methyl and other alkyl esters of rosin, limed rosin, rosin alcohols and their esters, phenolic-type resins, coumarone-indene resins, chlorinated naphthalene, blown castor oil, and the like.

Example 1

The polymeric fat acid employed had the following composition:

| | |
|---|---|
| Percent monomer | 10.0 |
| Percent dimer | 69.5 |
| Percent trimer | 20.5 |
| D/T ratio | 3.39 |
| Acid number | 186.5 |
| Saponification equivalent | 291.1 |

Forty pounds of this polymeric fat acid, 2.4 pounds of cottonseed fatty acids, and 7.48 pounds of a 95.6% aqueous solution of diethylene triamine were heated with stirring to 200° C. Heating was effected slowly since a tendency toward foaming was observed. After the temperature reached 200° C. it was maintained there for 3 hours with vigorous agitation, and during the last hour vacuum was employed. At the end of the reaction period the vacuum was released and the product was cooled. The reaction mixture was maintained under an inert gas blanket during all the time at which it was at an elevated temperature with the exception of the time during which the vacuum was employed. The product had the following properties:

| | |
|---|---|
| Melting point (ball and ring), ° C | 46.0–46.5 |
| Color [1] (Gardner) | 10–11 |
| Viscosity [1] at 25° C. (Gardner-Holdt) | B–C |
| Acid number | 5.2 |
| Amine number | 86 |

[1] Determinations carried out on 35% solutions in butanol-toluene (1:1).

To 32.3 pounds of the above resin heated to 160° C. there was added with vigorous stirring 32.3 pounds of hot water containing 0.26 pound of acetic acid. After agitation for one hour, there resulted an extremely smooth dispersion, which provided a continuous tacky film. The suspensoid demonstrated the following properties.

| | |
|---|---|
| Percent solids | 52.1 |
| Acid number | 6.0, 6.1 |
| Amine number | 43.2, 43.8 |
| pH | 7.6 |

Example 2

349.3 parts of the polymeric fat acid of Example 1 and 116.8 parts of triethylene tetramine were heated with stirring to 200° C. The heating period required about 2 hours, during which time the vapor temperature was never allowed to exceed 99° C. The reaction mixture was then maintained with stirring at 200° C. for 3 hours, and during the last hour vacuum was employed. Thereafter the product was cooled. Again an inert atmosphere was employed while the product was at an elevated temperature. The product had the following properties:

| | |
|---|---|
| Melting point (ball and ring), ° C | 27–28 |
| Color (Gardner) | 8–9 |
| Viscosity at 25° C. (Gardner-Holdt) | A–1 |
| Acid number | 3.4 |
| Amine number | 177.0 |

Five hundred parts of the resin were heated to 150° C. and to the heated resin were added 930 parts of water containing 4 parts of glacial acetic acid, the water having been heated first to 90° C. After the addition vigorous stirring was employed for approximately one-half hour, and a stable suspensoid resulted. This suspensoid, likewise, produced continuous tacky films.

Example 3

The resin, the dispersion of which is to be described in this example, was prepared in such a way that the ratio of total amine to carboxyl groups was 2:1. The amine employed was diethylene triamine, and the dimer acids employed were those described in Example 1. A mixture of 1164.5 parts of the dimer acid and 286.2 parts of 95.6% diethylene triamine were heated slowly with stirring to a temperature of 200° C. During this time the bulk of the water of reaction, as well as the water contained in the diethylene triamine, was removed. Vigorous stirring was employed. Thereafter the temperature was maintained at 200° C. for 3 hours, again with vigorous stirring, and during the third hour vacuum was employed. The product obtained by this means had the following properties:

| | |
|---|---|
| Melting point (ball and ring), ° C | 26 |
| Color (Gardner) | 8–9 |
| Viscosity at 25° C. (Gardner-Holdt) | A–1 |
| Acid number | 3.4 |
| Amine number | 123.7 |

The dispersion of this resin was accomplished by melting 50 parts of it and heating the melt to a temperature of 150° C. Thereafter a solution of 50 parts of water containing 0.4 parts of glacial acetic acid, heated to 90° C., was added with vigorous stirring. After agitation for about one-half hour, there resulted an extremely smooth dispersion which provided, on coating, a continuous tacky film. The suspensoid had the following properties:

| | |
|---|---|
| Percent solids | 50.3 |
| Acid number | 7.2 |
| pH | 5.8 |

Example 4

The polyamide resin was prepared as described in Example 1 using the dimer acid characterized there with 1,3-diamino butane. Sufficient excess of this amine was employed so that the final composition had an amine number of 68.3. This product was dispersed readily by the following procedure: To 100 parts of it in a molten condition was added 186 parts of hot water containing 1 part glacial acetic acid. Stirring caused the resin to disperse and the dispersed material deposited a continuous tacky film.

Example 5

A polyamide resin was prepared from the dimer acid characterized in Example 1 and a mixture of diethylene triamine and ethylene diamine. Thus there was employed 437.5 parts of the dimer acid, 17.5 parts cottonseed acids, 36.2 parts of diethylene triamine, and 34.7 parts of 68% ethylene diamine. The mixture of acids was heated to 130° C. with stirring, after which the mixture of amines was added dropwise at a rate such that the vapor temperature did not exceed 100° C. After completion of the addition, the temperature of the reaction mixture was raised to 200° C. at a similar rate. The reaction mixture was maintained with stirring at 200° C. for a period of 3 hours and vacuum was employed during the last hour. The product had the following properties:

| | |
|---|---|
| Amine number | 36.6 |
| Acid number | 9.0 |
| Melting point (ball and ring), ° C | 68.0–71.5 |
| Viscosity (Gardner-Holdt) | E–F |
| Color (Gardner) | 9–10 |

To prepare a dispersion with a solids content of 35% 50 parts of the above described resin were heated to 140° C., after which a solution of 0.85 part of acetic acid in 93 parts of water was heated to 90° C. and was added to the molten resin with vigorous stirring. A dispersion occurred readily which provided a tacky continuous film.

To obtain a dispersion with a solids content of 50% 50 parts of the above resin were heated to 140° C., and were treated with a solution of 0.43 part of acetic acid in 50 parts of water, the said solution having been heated to 90° C. Again vigorous stirring served to effect dispersion, and a product resulted which provided tacky continuous films.

Example 6

The resin described in Example 1 was dispersed with glycolic acid by the following procedure: To 100 parts of this resin heated to 150° C. was added a solution of 2.1 parts of 85% glycolic acid in 185 parts of water, said solution having been heated to 90° C. Dispersion resulted readily and the suspensoid provided a film which was continuous and tacky.

Example 7

The experiment of the preceding example was repeated, save that 1.5 parts of lactic acid was substituted for the glycolic acid. The product was entirely similar to the one in the preceding example.

Example 8

A melt was made of 50 parts of the polyamide resin described in Example 1 and 50 parts of a polyamide resin prepared by reacting dimer acids with ethylene diamine. The preparation of this latter polyamide resin is described in detail in Example 2 of our copending application Serial No. 141,262. This melt was heated to 150° C., after which was added a hot solution of 1 part of 85% glycolic acid in 100 parts of water. Vigorous mechanical stirring produced a stable dispersion which provided a continuous tacky film.

Example 9

To a melt of 100 parts of the mixed polyamide resins described in Example 8 was added 185 parts of hot water containing 1.6 parts of glacial acetic acid. A very smooth dispersion resulted with a solids content of 35% and a pH of 8.1. This material like the preceding ones provided a tacky continuous film.

Example 10

To 100 parts of a melt of the mixed polyamide resins described in Example 8, at 160° C., were added 100 parts of water which contained 0.7 part of lactic acid. The solution of water and lactic acid was heated to 90° C. prior to addition. Vigorous stirring produced an excellent dispersion with a pH of 10.4 and a solids content of 50%. This product likewise provided tacky continuous films.

Example 11

A melt was made of 150 parts of the polyamide resin described in Example 1, 15 parts of the glycerol ester of hydrogenated rosin and 15 parts of a mixture of ortho- and paraethyltoluene sulfonamide. To this melt at 150° C. was added 6 parts of paraffin. When complete homogeneity was obtained, the melted mixture was treated with 277 parts of hot water containing 2.4 parts of glacial acetic acid. An extremely stable dispersion resulted which provided tacky continuous films.

Example 12

A melt was made from 100 parts of the polyamide resin described in Example 1, 10 parts of the mixture of ortho- and para-ethyltoluene sulfonamide, 8 parts of the ethylene glycol ester of polymerized rosin, and 4 parts of paraffin. To this melt heated to 160° C. was added 210 parts of hot water containing 1.6 parts of glacial acetic acid. Vigorous agitation produced a dispersion which was extremely stable and which provided tacky continuous films.

Example 13

The melt described in the preceding example was treated in a similar fashion with 122 parts of water containing 0.8 part of glacial acetic acid. In this way a dispersion was produced on vigorous stirring with a solids content of 50%, and this dispersion likewise provided continuous tacky films.

Example 14

A melt was made of 100 parts of the polyamide resin described in Example 1, 10 parts of tributyl phosphate, and 8 parts of the ethylene glycol ester of polymerized rosin. To this melt at 160° C. was added a hot solution of 118 parts of water and 0.8 part of glacial acetic acid. Vigorous stirring produced a dispersion which was extremely stable and which provided tacky continuous films.

Example 15

A melt was made of 100 parts of the polyamide resin described in Example 1, 8 parts of the ethylene glycol ester of polymerized rosin, and 10 parts of 1,1'-isopropylidenebis(p-phenyleneoxy)-di-2-propanol. To this melt at 160° C. was added a solution of 118 parts of hot water and 0.8 part of glacial acetic acid. Agitation produced an excellent dispersion which provided tacky films.

Example 16

A melt was made of 100 parts of the polyamide resin described in Example 1 and 10 parts of gum rosin. To this melt at 140° C. was added with vigorous stirring a solution of 195 parts of hot water and 1.6 parts of glacial acetic acid. A stable dispersion resulted with a solids content of 36% and a pH of 8.0. The product produced continuous tacky films.

Example 17

To 100 parts of the polyamide resin described in Example 1 was added 10 parts of paraffin and the mixture was heated to 140° C. Thereafter a hot solution of 185 parts of water and 1.6 parts of glacial acetic acid was added with vigorous stirring. An excellent dispersion resulted with a solids content of 36% and a pH of 8.8. This material provided a tacky continuous film.

Example 18

To a melt of 100 parts of polyamide resin described in Example 1 and 10 parts of a monoglyceride of a rosin-fatty acid fraction from tall oil in which the rosin-fatty acid ratio was about 70:30, was added 110 parts of hot water containing 0.8 part of glacial acetic acid. Vigorous stirring produced a stable dispersion which was extremely tacky and formed continuous films.

Example 19

The experiment described in the preceding example was repeated save that 8 parts of the glycerol ester of polymerized rosin was substituted for the monoglyceride of the preceding example. Again an excellent dispersion resulted which provided continuous tacky films.

Example 20

The procedure of the preceding example was used in order to obtain dispersions of mixtures of the polyamide resin described in Example 1 with a wide variety of commercial resins. In all cases 100 parts of polyamide resin was used with 8 parts of the resin and the dispersion was accomplished by adding 100 parts of water containing 0.8 part of glacial acetic acid to the melt with vigorous stirring. Excellent dispersions occurred in every case. Typical of the commercial resins employed are those designated as Amberol M-93, Durez 209, Durez 220, Piccolastic A-25, Vinsol Resin, Vinsol Ester Gum, Khrumbhaar Resin, Neolyn 35, and Flexalyn C.

Example 21

The dispersion of Example 1 was entirely compatible with most commercially available dispersions of polyvinyl acetate. The two dispersions could be mixed readily and films from these indicated complete compatibility. These films were more flexible and more tacky than films from polyvinyl acetate themselves.

Example 22

The dispersion described in Example 1 was entirely compatible with numerous cationic and non-ionic emulsions, dispersions, and latices. Specific compositions which demonstrate this compatibility are the following:

To 100 parts of the dispersion described in Example 1 was added with fairly vigorous stirring 80 parts of a polyvinyl acetate emulsion of 55% solids content. The polyvinyl acetate emulsion used is known commercially as Elvacet. The polyvinyl acetate emulsion was compatible with the suspensoid of Example 1 in all proportions.

To 100 parts of the suspensoid of Example 1 was added 100 parts of a polymethyl methacrylate emulsion of 32% solids content. This emulsion was cationic in nature and is known as Methacrol SH. Complete compatibility was noted.

To the suspensoid of Example 1 (100 parts) was added 50 parts of a neoprene rubber latex of 50% solids content. This neoprene latex was cationic and was termed neoprene latex type RCD-1285.

Cationic butadiene-styrene latices were prepared as described in Example 26 of our copending application Serial No. 141,262. These were compatible in all proportions with the suspensoid described in Example 1 of this application.

Example 23

To 200 parts of the dispersion described in Example 1 was added 90 parts of a 10% solution of low viscosity polyvinyl alcohol. An extremely stable composition resulted with high viscosity and excellent coating properties.

Example 24

To 100 parts of the dispersion described in Example 1 was added 10 parts of a 10% solution of low viscosity methyl cellulose. This served to thicken the dispersion and excellent coatings which were still tacky were obtained.

Example 25

The experiment of the preceding example was repeated save that 10 parts of a 10% high viscosity methyl cellulose was employed. Here again very marked thickening of the dispersion resulted.

Example 26

To 100 parts of the dispersion described in Example 1 was added 10 parts of a 10% solution of gum arabic. The viscosity of the dispersion was increased slightly.

We claim as our invention:

1. A suspensoid in an aqueous medium of a polyamide having a polyacyl group derived from polymeric fat acids, and a polyamino group derived from an aliphatic polyamine, the amino groups primarily involved in the polyamide formation being separated by at least 3 atoms, the polyamide having a melting point within the approximate range of 25° to 95° C. and having a molecular weight within the approximate range of 1,000 to 10,000, said polyamide having an amine number of from 5 to 200 and being dispersed in an aqueous medium by means of a quantity of acid equivalent to an amine number of from 5 to 4 to produce a stable suspensoid, said suspensoid being capable of forming continuous tacky films.

2. A suspensoid in an aqueous medium of a polyamide having a polyacyl group derived from polymeric fat acids, and a polyamino group derived from an aliphatic polyamine, the amino groups primarily involved in the polyamide formation being separated by at least 3 atoms, the polyamide having a melting point within the approximate range of 25° to 95° C. and having a molecular weight within the approximate range of 1,000 to 10,000 said polyamide having an amine number of from 10 to 200, and being dispersed in an aqueous medium by means of a quantity of acid equivalent to an amine number of from 5 to 40 to produce a stable suspensoid, said suspensoid being capable of forming continuous tacky films.

3. A product according to claim 1 in which the polyamine is diethylene triamine.

4. A product according to claim 1 in which the polyamine is triethylene tetramine.

5. A product according to claim 1 in which the polyamine is 1,3-diamino butane.

6. A product according to claim 1 in which the acid is acetic acid.

7. Process of producing a stable aqueous suspensoid capable of forming continuous tacky films from a polyamide having a polyacyl group derived from polymeric fat acids, and a polyamino group derived from an aliphatic polyamine, the amino groups primarily involved in the polyamide formation being separated by at least 3 atoms, the polyamide having a melting point within the approximate range of 25° to 95° C. and a molecular weight within the approximate range of 1,000 to 10,000 and having an amine number of from 5 to 200 which comprises melting said polyamide and raising its temperature to within the approximate range of 130-170° C., adding thereto hot water containing a quantity of dissolved acid, equivalent to an amine number of from 5 to 40 and agitating the resulting mixture to produce the suspensoid.

8. Process of producing a stable polyamide suspensoid capable of forming continuous tacky films from a polyamide having a polyacyl group derived from polymeric fat acids, and a polyamino group derived from diethylene triamine, the polyamide having a melting point within the approximate range of 25-95° C. and a molecular weight within the approximate range of 1,000 to 10,000 and having an amine number of from 5 to 200 which comprises melting the polyamide and maintaining its temperature within the approximate range of 130° C. to 170° C., adding thereto hot water containing a quantity of dissolved acid equivalent to an amine number of from 5 to 40 and agitating the resulting mixture to produce the suspensoid.

References Cited in the file of this patent

UNITED STATES PATENTS

| | | |
|---|---|---|
| 2,122,418 | Gladdings et al. | July 5, 1938 |
| 2,169,366 | Meigs | Aug. 15, 1939 |
| 2,342,387 | Catlin | Feb. 22, 1944 |
| 2,345,632 | Robinson | Apr. 4, 1944 |
| 2,379,413 | Bradley | July 3, 1945 |
| 2,450,940 | Cowan et al. | Oct. 12, 1948 |

UNITED STATES PATENT OFFICE

CERTIFICATE OF CORRECTION

Patent No. 2,811,459　　　　　　　　　　　　　　　　　October 29, 1957

Harold Wittcoff et al.

It is hereby certified that error appears in the printed specification of the above numbered patent requiring correction and that the said Letters Patent should read as corrected below.

Column 2, line 37, for "diabasic" read -- dibasic --; column 3, line 14, for "number" read -- numbers --; column 7, line 68, for "hat" read -- hot --; column 10, line 1, for "from 5 to 4" read -- from 5 to 40 --.

Signed and sealed this 7th day of January 1958.

(SEAL)
Attest:

KARL H. AXLINE　　　　　　　　　　　　　　　　　　　ROBERT C. WATSON
Attesting Officer　　　　　　　　　　　　　　　　　　Commissioner of Patents